Nov. 29, 1966 J. A. M. LEDUC 3,288,692
ELECTROCHEMICAL PROCESS FOR THE PRODUCTION OF ORGANIC OXIDES
Filed Sept. 20, 1962 5 Sheets-Sheet 3

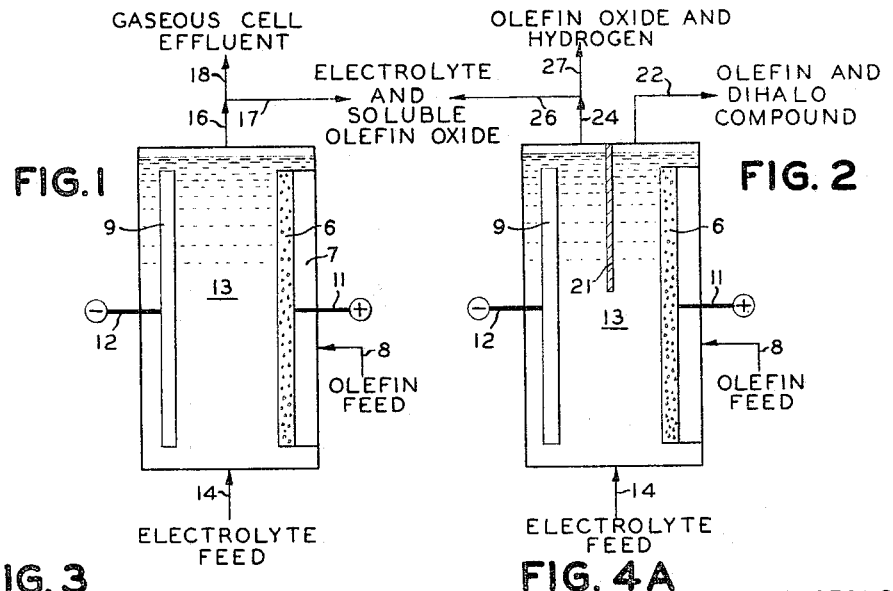

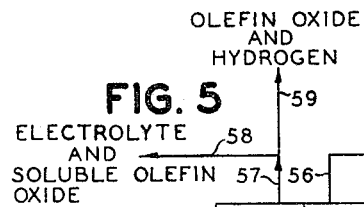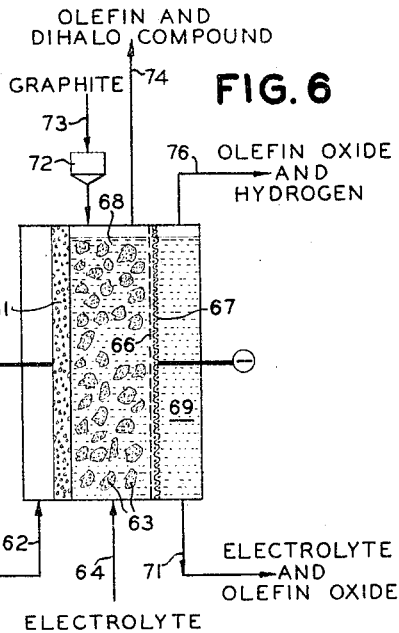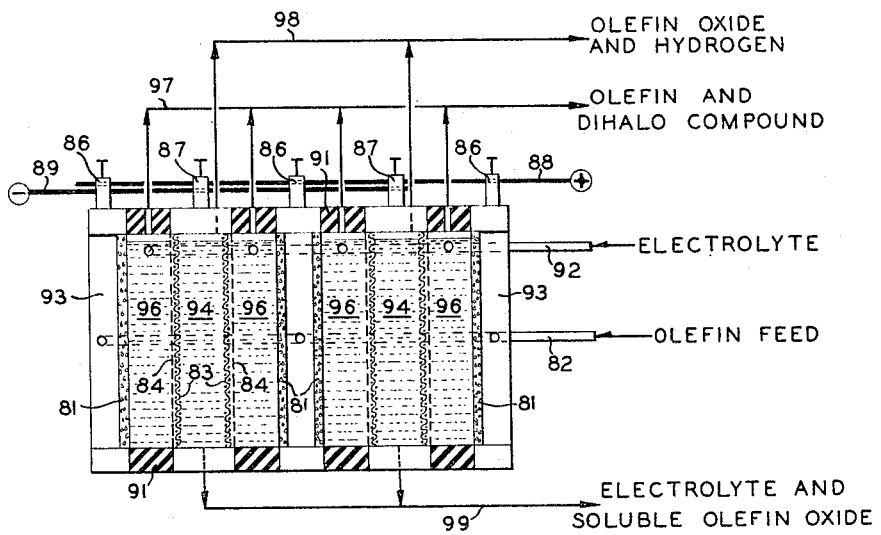

INVENTOR.
JOSEPH ADRIEN M. LEDUC

BY G. H. Palmer
John C. Quinlan
Maylin Klosty
ATTORNEYS

United States Patent Office 3,288,692
Patented Nov. 29, 1966

3,288,692
ELECTROCHEMICAL PROCESS FOR THE PRODUCTION OF ORGANIC OXIDES
Joseph Adrien M. Leduc, Short Hills, N.J., assignor to Pullman Incorporated, a corporation of Delaware
Filed Sept. 20, 1962, Ser. No. 224,991
22 Claims. (Cl. 204—80)

This invention relates to an improved process for the production of oxides of organic compounds. In one aspect the invention relates to the direct production in an electrolytic cell of oxides of organic compounds containing at least one ethylenic unsaturated double bond such as the oxides of ethylene and propylene. In another aspect the invention relates to electrochemical apparatus in which the process of this invention is effected.

Olefin oxides constitute a valuable group of organic chemicals which are useful as such or as building blocks for other chemicals and industrial products. Ethylene oxide and propylene oxide, for example, are used to produce the corresponding glycols. Ethylene glycol is used widely in the automotive antifreeze industry. Propylene glycol is used widely as an edible solvent for flavors. The olefin oxides are also useful in the manufacture of cellulosic textiles and, in recent years, large quantities of propylene oxide have been consumed in the manufacture of polyurethanes. These oxides and others such as styrene oxide are also useful in the manufacture of resinous condensation products such as those obtained by condensation of the oxide with phenol. Other industrial outlets for such oxides include their use as fumigants and nonionic detergents.

Ethylene oxide is produced commercially by two principal methods. One method is the catalytic air oxidation of ethylene using silver as catalyst. The yields of this direct oxidation method are generally of only about 50 to 60 percent. Another drawback is that the efficiency of this method is limited by high local temperatures due to the exothermic nature of the reaction and the resulting formation of carbon dioxide and water. In addition to the poor yields obtained in the direct oxidation method, that method requires a large consumption of silver (about 1.4 pounds of silver per ton of oxide produced) and large amounts of electrical energy for the various compressions (1700 kilowatt hours per ton of oxide). In addition, a small amount of ethylene dichloride, used as an anticatalyst, is purchased for the process.

The other method for the production of ethylene oxide is the chlorohydrin process by which ethylene is first reacted with chlorine in the presence of water to form ethylene chlorohydrin. The chlorohydrin is then treated in a separate dehydrochlorination stage with calcium hydroxide forming ethylene oxide and calcium chloride as shown by the following equation:

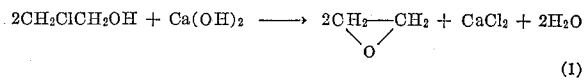

(1)

Propylene oxide also is produced by this multistage chlorohydrin process, the direct oxidation of propylene not having been applied commercially because of low yields.

In addition to the fact that the prior art chlorohydrin method is a multistage process and requires the handling of molecular chlorine, another disadvantage is that chlorine value essential for the process is lost as chloride byproduct (e.g., calcium chloride) formed in the dehydrochlorination stage shown in Equation (1) above.

It is an object of this invention to provide an improved method by which an aliphatic carbon-to-carbon double bond is oxidized to form an oxide linkage.

Another object is to provide an improved method for the manufacture of olefin oxides such as ethylene oxide and propylene oxide by which the oxide is formed from the olefin within the one reaction zone.

Another object is to provide a method for producing olefin oxides by an electrochemical process by which the only chemicals which need to be charged to the reaction zone are olefin and an aqueous solution of a metal halide.

Another object is to provide an economical and simplified method for producing ethylene oxide and propylene oxide in good yields and selectivity.

A further object is to provide an improved method for producing olefin oxides from olefin via a chlorohydrin intermediate with a minimum formation of other oxygen-containing derivatives such as the corresponding glycols and ethers.

A further object is to provide suitable and improved apparatus in which the above process may be effected.

Various other objects and advantages of this invention will become apparent to those skilled in the art from the accompanying description and disclosure.

Accordingly, the above objects are accomplished by the process which comprises electrolyzing an aqueous medium comprising a metal halide electrolyte while introducing an olefin to the vicinity of the anode of the electrolytic reaction zone to produce olefin oxide, and recovering said olefin oxide as a product of the process. During the electrolysis of the metal halide, the halide is oxidized electrochemically at the anode to generate free halogen which reacts with the olefin in the presence of the water of the electrolyte medium to form the halohydrin derivative of the olefin. In accordance with one embodiment of the present invention, water is electrolyzed at the cathode of the electrolytic cell forming hydroxyl ion and hydrogen, the halohydrin reacting with the hydroxyl ion thus formed to produce the olefin oxide within the cell.

The overall principal reaction which takes place by the process of this invention is shown by the following equation wherein the grouping

is used to represent the olefin which is fed to the vicinity of the anode of the electrolytic cell:

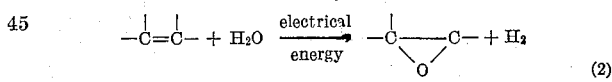

(2)

As shown by this general equation the only raw materials which are consumed in the formation of the olefin oxide are the olefin, water and electrical energy, the metal halide electrolyte being regenerated in situ, i.e., within the electrolytic cell. In addition to the fact that the olefin oxide is produced in good yields and selectivity, hydrogen is also generated in good yields and is recovered in substantially pure form as a valuable second product of the process.

In operation, the electrolytic cell, which may be of the diaphragm, diaphragmless, or gravity type, is charged with the aqueous electrolyte medium comprising a metal halide. Electrical energy is applied to the cell to initiate the electrolysis reaction as the olefin is introduced to the vicinity of the anode. The reaction which takes place in the anodic electrolyte or anolyte results in the formation of the halohydrin derivative of the olefin. Several mechanisms are postulated for the halohydrin forming reaction. Thus, it is postulated without limiting the scope of this invention that the halohydrin is produced by either the formation of a halonium ion intermediate (Equations 4–5, below) or via the addition of hypohalous acid to the olefin (Equations 6–7, below). In either case, the metal halide is first electrolyzed as shown by the following Equation (3) in which MX is used to typically illustrate one group of suitable metal halides, M being an alkali metal, for example, and X being any of the halogens:

$$2MX \xrightarrow[\text{energy}]{\text{electrical}} 2M^+ + X_2 + 2e^- \quad (3)$$

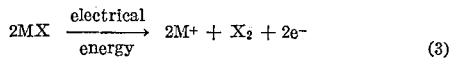
(4)

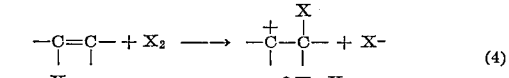
(5)

$$X_2 + H_2O \longrightarrow HX + HOX \quad (6)$$

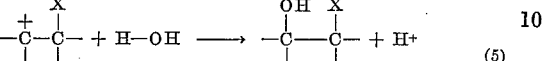
(7)

Other theories and mechanisms, such as Equations (3) and (4) proceeding via formation of a free radical instead of the halonium ion, may equally explain the nature of the reactions by which the halohydrin is formed, without departing from the scope of this invention. The overall reaction which takes place in the anolyte is expressed by the following equation:

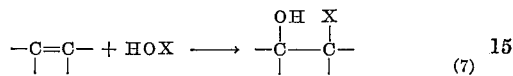
(8)

In accordance with one embodiment of the invention, conditions are controlled to favor the formation of the halohydrin derivative of the olefin in the anolyte with minimum formation of the dihalo derivative of the olefin which is formed by direct addition of halogen across the olefinic double bond. However, any dihalo derivative which is formed is readily recovered as another product of the process.

The term "anolyte" as used herein is intended to describe the aqueous electrolyte medium at, and in the vicinity of, the anode or anodes of the electrolytic cell, i.e., that portion of the aqueous medium in which the formation of halohydrin occurs.

While the halohydrin forming reactions are occurring in the vicinity of the anode, water is electrolyzed at the cathode of the electrolytic cell forming hydroxyl ion and hydrogen. The cathodic electrolyte or catholyte is, therefore, alkaline and, as the halohydrin intermediate in the anolyte comes into contact with the alkaline catholyte, it is dehydrohalogenated forming olefin oxide, water and regenerating halide ion. In addition, the hydrohalic acid (HX) formed in the anolyte in accordance with Equation (8) above reacts with the alkaline medium thereby converting that acid to additional metal halide electrolyte. The reactions which occur in the vicinity of the cathode are shown by the following equations:

$$2H_2O + 2e^- \rightarrow H_2 + 2OH^- \quad (9)$$

$$2M^+ + 2OH^- \rightarrow 2MOH \quad (10)$$

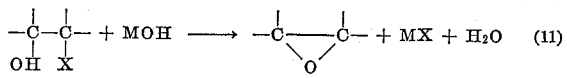
(11)

$$HX + MOH \rightarrow MX + H_2O \quad (12)$$

wherein M is an alkali metal, for example, and X is halogen.

The term "catholyte" as used herein is intended to describe the aqueous electrolyte medium at, and in the vicinity of, the cathode or cathodes of the electrolytic cell, i.e., that portion of the aqueous medium in which the reactions of Equations (9)–(12) above occur.

In accordance with the teachings of this invention, the above reactions occur within the electrolytic cell, the olefin oxide being formed within the cell. Olefin oxide product is recovered either from the gaseous cell effluent or from the aqueous reaction cell medium or from both the gaseous effluent and aqueous medium. The particular method of recovery of product depends largely upon the physical state and solubility of the particular oxide in the aqueous medium under reaction conditions.

The metal halide which is charged to the electrolytic cell may be any water soluble compound whose corresponding hydroxide is also water soluble. Usually employed are the metal halides having the general formula $MX_y$, wherein M is sodium, potassium, lithium, barium, calcium, strontium, or magnesium; X is any of the halides, i.e., fluoride, chloride, bromide or iodide; and $y$ is an integer whose value depends on the valence or oxidation state of the metal. Also included within the scope of this invention is the use of a mixed electrolyte system such as mixtures of sodium chloride and potassium chloride, mixed salts improving, for example, the conductivity of the electrolyte. Inasmuch as the metal hydroxide which forms at the cathode is utilized within the cell and the economics of the process does not depend upon recovery of hydroxide as a product of the process, mixed electrolytes are useful and, from the standpoint of improvement of conductivity, are advantageously employed. Of the metal halides which may be employed, the alkali metal halides are preferred in view of the greater water solubility of the alkali metal hydroxides. Of the alkaline earth metal halides, those of barium are preferred in view of the greater water solubility of barium hydroxide as compared with the solubility of the hydroxides of the other alkaline earth metals. Although the bromides and iodides of the alkali metal and the alkaline earth metals are more soluble in water than the fluorides and chlorides, the chlorides are usually employed because of their greater availability and for economic reasons. However, in other instances the choice of halide will be governed by the ultimate use of the dihalo compound which is formed in varying quantities at the anode as a secondary reaction involving direct halogenation of the olefin. Thus, when it is desired to recover the dihalo byproduct as dichloro, a metal chloride is used; when the dibromo derivative is desired, a metal bromide is used, etc.

The aqueous electrolyte fed to the cell need not be rigorously pure and may contain various salt impurities. When rock salt or well brine is used, it is preferred to subject such salts to well-known pretreatment procedures to remove sludge and insolubles such as carbonates, sulfates, etc., and thus avoid accumulation of such residue in the electrolytic cell and transfer lines.

The metal halide content of the aqueous electrolyte may vary from dilute to saturated solutions. For example, when sodium chloride is used, the feed brine may contain from about 30 grams per liter to about 340 grams per liter of electrolyte solution, other salts being used in amounts sufficient to yield an equivalent amount of halide ion on a mole basis. From the standpoint of improving conductivity and reduction of voltage demand, the more highly concentrated solutions are preferred. However, when it is desired to minimize the formation of the dihalo compound, it is preferred to use electrolyte solutions which are less than saturated. For example, when sodium chloride is the electrolyte, it is usually present in a concentration from about 60 to about 240 grams per liter of salt solution, the other metal halides being used in amounts sufficient to yield an equivalent amount of halide ion on a mole basis.

The electrolyte is preferably introduced to the cell in the vicinity of the anode. The anodic feed causes circulation of the anolyte in the direction of the cathodic region and thus effectuates displacement of the halohydrin as it is formed, into the cathodic region where it is converted rapidly to the desired olefin oxide product. The rate at which electrolyte is charged to the cell may vary over a relatively wide range such as from about 10 to about 1500 cubic centimeters (cc.) per minute per square foot of apparent electrode surface.

Olefin reactant is introduced into the vicinity of the anodes positioned within the electrolytic cell. The olefin reactant is any organic compound having at least one carbon-to-carbon double bond which is the reactive site at which the oxygen linkage is formed during the process. Included within the scope of this invention is the use of the substituted and unsubstituted acyclic and alicyclic monoolefins and polyolefins including straight and branched chain olefins, as well as those in which the ethylenic double bond is in a terminal or nonterminal position or within a cycloaliphatic ring. The olefin may be normally gaseous, normally liquid or normally solid. When solid olefins are used, they are preferably charged to the vicinity of the anode, dissolved or dispersed in any suitable inert solvent such as a paraffinic or aromatic hydrocarbon or mixtures thereof including petroleum fractions such as hydrogenated kerosene, etc. Generally the olefin has no more than 12 carbon atoms per molecule, and usually has no more than 8 carbon atoms per molecule.

Typical examples of suitable olefins for use in the process of this invention are the alkenes of the homologous series $C_nH_{2n}$ wherein $n$ is an integer from 2 to about 12 such as ethylene, propylene, butene, pentene, hexane, heptane . . . dodecene, etc., including olefins in which the double bond is in a nonterminal position such as 2-butene, 2-pentene, etc., and branched olefins such as isobutene, isopentene, 4-ethyl-2-hexane, as well as branched compounds in which the double bond is in the side chain such as 2-methenepentane and alkenyl compounds such as 4-propene-4$^1$-yl-octane and cyclic olefins such as cyclopentene, cyclohexene, etc. Polyolefins are also useful as feed to the vicinity of the anode and include those containing isolated, cumulative or conjugated double bonds such as diallyl, allene, and butadiene, isoprene and 2,3-dimethylbutadiene. In addition to the above, olefins substituted with aryl and halogen groups also may be used. Typical examples of suitable substituted olefins are styrene, stilbene and allyl chloride.

The olefin need not be pure and may contain paraffinic and other impurities normally found in commercially available olefins. For example, commercial grades of ethylene and propylene are suitable and normally contain low molecular weight paraffins such as ethane, propane, etc. A gas such as nitrogen may be used as a carrier or diluent for the olefin feed and may be used in amounts between about 5 and about 95 volume percent of the total feed.

The rate at which the olefin is fed to the vicinity of the anode is dependent upon the rate of conversion of the olefin which is between about 5 and about 95 percent. The lower limit is set by strong displacement of the electrolyte from the electrode interface.

The electrolytic cell or reaction zone is operated over a wide range of temperature and pressure conditions. The process is effected maintaining the temperature of the aqueous medium within the electrolytic cell from about 32° F. to the boiling point of the aqueous electrolyte which at atmospheric pressure is usually about 220° F. The pressure may be substantially atmospheric or above atmospheric such as up to about 20 atmospheres. Temperature and pressure are interrelated to the extent that they are controlled to maintain the aqueous electrolyte system in the liquid phase. Thus when the cell is operated at a temperature above the atmospheric boiling point of the aqueous electrolyte system, the cell is operated at a pressure sufficiently high to maintain the liquid phase.

In accordance with one embodiment of the invention, the electrolytic cell is operated at an elevated temperature usually between about 90° F. and about 200° F. at which temperatures formation of the olefin oxide as the predominant organic compound is favored and the formation of the dihalo derivative of the olefin is minimized. Within the preferred temperature range the halogen content of the anolyte is less than at the lower temperatures and is usually between about 0.1 and about 1 weight percent. This relatively low concentration of halogen results in a rapid formation of the halohydrin and suppresses or minimizes formation of the dihalo compound. Other advantages in maintaining the aqueous medium at an elevated temperature are that olefin oxide production in the gaseous effluent from the cell is increased, and conductivity of the system is improved.

As indicated above, the reaction zone may be operated satisfactorily at atmospheric pressure. In certain instances higher pressure is advantageously employed. In order to suppress formation of halogenated byproducts, such as the dihalo derivative of the olefin, it is sometimes preferred to operate at a lower conversion of olefin to halohydrin. One method by which conversion is maintained at a relatively low level is to increase the flow rate of olefin. However, high olefin flow rates may cause undesirable violent agitation at the electrode-anolyte interface and excessive displacement of the anolyte from the electrode surface. In order to prevent such undesirable disturbance at the anode-anolyte interface when high olefin flow rates are used, it is preferred to operate under pressure in order to produce the olefin oxide in good selectivity at low conversion. A further advantage in using increased pressure is that olefin solubility in the anolyte is improved, thereby facilitating the reaction. A further advantage is that higher pressure allows the use of higher current densities at which dihalo formation is minimized.

The electrolytic reaction zone is operated over a wide range of current density such as between about 50 and about 1000 amperes per square foot of apparent electrode surface. The operating voltage of the cell is at least that voltage required to obtain electrolysis of the metal halide. The minimum voltage, therefore, depends upon the particular electrolytic system. For example, when a chloride is used as the source of halogen for the halohydrin intermediate, a voltage of at least 3.1 volts is required. In operation, however, the voltage demand is increased above the minimum or decomposition voltage due to a combination of a variety of factors such as polarization and overvoltage. It has been found that the olefin reactant introduced to the vicinity of the anode reduces the electrode overvoltage depending upon the particular anode material, and thereby decreases polarization. In this connection it also is preferred to use porous hollow anodes instead of solid electrodes and to introduce the olefin to the anode such that the olefin reactant diffuses through the pores thereof reacting at the interface of the pores where contact between the olefin, electrolyte and electrode occurs thereby producing product, reducing overvoltage and polarization.

Positioned within the electrolytic cell is one or more anodes and cathodes in alternating relationship. As indicated above, the anodes may be either solid or porous and are preferably porous. The anode may be composed of graphite, platinum, platinized titanium, platinized tantalum, magnetite, or an inert substrate such as polyethylene, Teflon, etc., metallized with copper or silver and having platinum deposited thereon as the metal which is exposed to the aqueous medium. Electrodes of the latter type are prepared in accordance with the techniques described in my prior and co-pending application Serial No. 162,221, filed December 26, 1961, now U.S. Patent No. 3,235,473.

The cathode may be composed of any conductive material which is chemically inert to caustic and is usually composed of steel or stainless steel. The cathode is usually in the form of a foraminous metal (e.g., ferrous metal) and may be used with or without a diaphragm.

The process of this invention is operable in a batchwise or continuous manner and is preferably conducted on a continuous basis so as to avoid buildup of reactants and products in the anolyte and catholyte and thus minimize side reactions and concentration polarization effects.

In conducting the process in a continuous manner the aqueous medium is continuously fed to the anode compartment, the cell being maintained under the above conditions of temperature, pressure and current density. The olefin is continuously introduced into the vicinity of the anodes. Unreacted excess olefin, when sufficiently volatile as in the case of ethylene or propylene, for example, passes from the cell as gaseous effluent. When the olefin reactant is of low molecular weight such as ethylene or propylene, the dihalo byproduct is entrained and passes out of the cell with unreacted olefin in the gaseous effluent. Gaseous effluent exiting from the anolyte consists essentially of unreacted olefin and dihalo byproduct, when formed, which is then subjected to separation to recover olefin which is then recycled to the region of the anode.

Olefin oxide product is found in the gaseous cell effluent and in the catholyte and is recovered therefrom by withdrawing aqueous electrolyte medium from the vicinity of the cathode. The aqueous electrolyte is then treated to recover the olefin oxide product therefrom. This is accomplished by any suitable separation technique, such as by passing the catholyte through vacuum operated flash towers. It has been found, quite unexpectedly, that only negligible amounts of other oxygen-containing organic compounds such as glycols resulting from hydrolysis of the olefin oxide product within the cell are produced by the process of this invention. From this standpoint, therefore, the electrolyte, after separation of the olefin oxide, may be recycled to the electrolytic cell without being subjected to further separation to remove water soluble glycols. Although glycol formation is at a minimum during the electrolysis which takes place within the cell, glycol may form from any residual oxide in the electrolyte which is recycled to the cell. It is usually desirable, therefore, to separate substantially all of the olefin oxide product from the electrolyte prior to recycling electrolyte to the cell for reuse therein. Inasmuch as the electrolyte is recycled to the vicinity of the anode, any residual olefin oxide product present therein may hydrolyze upon contact with the anolyte which is generally acidic, particularly in the diaphragm type cell. It has been found that when recycled electrolyte containing olefin oxide is contacted with acidic anolyte, a large fraction of the oxide is converted to the halohydrin, the rate and the yields being dependent upon the conditions, a strong factor being the time of contact. It has been found, for example, that when electrolyte containing residual olefin oxide is contacted with aqueous anolyte, approximately 90 percent of the olefin oxide reacts to form halohydrin. However, about 10 percent of this oxide is converted to the corresponding glycol which is only difficultly separated from the aqueous electrolyte medium. In order to avoid this formation of glycol, therefore, the olefin oxide in the recycled electrolyte is usually reduced to a minimum, i.e., to about 0.01 percent or less. This is accomplished by passing the electrolyte, after it has been treated to remove the bulk of the olefin oxide product such as by fractional distillation, to a stripping zone wherein minor amounts of residual olefin oxide are removed by passing air, hydrogen or other stripping gases therethrough. In addition to being passed to a stripping zone or in lieu thereof, the electrolyte may be passed through a zone containing a catalyst capable of converting residual olefin oxide to halohydrin. Residual olefin oxide can also be separated from the recirculating electrolyte by converting the oxide to polyglycols which salt out and are removed by filtration in the electrolyte treating zone. Any minor amounts of glycol which may build up in the aqueous electrolyte medium are removed by intermittently subjecting the electrolyte to suitable fractional distillation.

After treatment of the aqueous electrolyte medium withdrawn from the cell to remove olefin oxide product, the aqueous medium is recycled to the cell for reuse therein. Inasmuch as metal halide electrolyte is regenerated within the cell, it is usually only necessary to add metal halide to the recycled aqueous stream to make up for any losses which may occur during the separation step to remove product and losses corresponding to the amount of dihalo byproduct formed.

In addition to recovery of olefin oxide product from the aqueous reaction medium, olefin oxide which is in the aqueous medium at the particular operating conditions is evolved in the gaseous cell effluent, gaseous hydrogen product which is generated at the cathode aiding in flushing out the vapors of olefin oxide.

As noted above, the process of this invention can be carried out in electrolytic cells of the diaphragmless, diaphragm and gravity types. In the diaphragmless cell the halohydrin which forms in the anodic region is transported to the cathodic region wherein the olefin oxide product is produced. Generally speaking, in the diaphragmless cell some metal hypochlorite forms. Another cell which is of the so-called gravity type and which is also diaphragmless operates on the basis of the difference in densities between the anodic electrolyte and cathodic electrolyte. The diaphragmless type cells are usually operated at a current density between about 30 and about 300 amperes per square foot of apparent electrode surface. The diaphragm type cell operates on the principle that the anode and cathode compartments are maintained separate by a diaphragm. In the latter type cell, the formation of metal hypohalite is avoided because of the diaphragm which separates the anode and cathode chambers. Generally the diaphragm type cell is operated at a current density between about 30 and about 500 amperes per square foot of apparent electrode surface.

A further discussion of the process and apparatus of this invention is had with reference to FIGURES 1–12 of the accompanying drawings.

FIGURES 1–4A illustrate suitable diaphragmless type cells, FIGURES 3 and 4 also being of the gravity type. FIGURE 4A represents the cell of FIGURE 4 in a stacked arrangement.

FIGURES 5–9 illustrate suitable diaphragm type cells, the principle of which is illustrated schematically by FIGURE 5. FIGURE 6 represents a longitudinal view in elevation of a cell having a large anodic surface. The cell of FIGURE 7 is also a longitudinal view in elevation of a cell having a compact arrangement of electrodes. The cell of FIGURE 8 is a three-sectioned cell, a modification thereof being illustrated by FIGURE 9.

Figure 8:
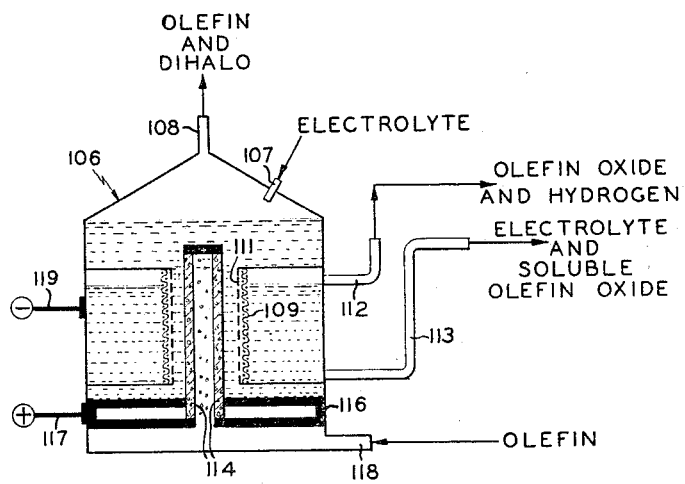

The cell of FIGURE 1 comprises porous anode 6 which encloses hollow section 7 into which olefin reactant is fed by means of line 8, and cathode 9 which comprises a foraminous ferrous metal. Electrical energy is supplied to anode 6 and cathode 9 by means of anode terminus 11 and cathode terminus 12, respectively. In operation, aqueous electrolyte 13 is introduced to the vicinity of anode 6 by means of inlet 14 positioned in the lower portion of the cell and olefin is introduced to the back of porous anode by means of line 8. The olefin diffuses through the pores of anode 6 and reacts in and at the porous surface thereof with elemental halogen and water which are generated and present, respectively, at the surface of the anode to form the halohydrin derivative of the olefin. As the halohydrin compound forms in the anodic region, it is transported to the vicinity of cathode 9 where it is converted to olefin oxide product. Exiting from the upper portion of the cell by means of outlet 16 is aqueous electrolyte containing soluble olefin oxide and gaseous cell effluent comprising olefin oxide, dihalo compound, unreacted or excess olefin and hydrogen. Aqueous electrolyte containing soluble olefin oxide product is withdrawn from line 16 by means of line 17 and the remaining gaseous cell effluent is passed through line 18 and is then subjected to suitable separation to recover olefin oxide, any dihalo byproduct, excess or unreacted olefin and hydrogen. The olefin oxide and hydrogen are recovered as products of the process, and the unrecated olefin is recycled to the cell for reuse therein.

In order to facilitate recovery of product when a diaphragmless type cell is employed and reduce the number of steps involved in separating the gaseous cell effluent, it is desirable to place a solid partition in the dome of the cell such that the gases from the anodic and cathodic regions do not intermix. For example, the cell of FIGURE 1 fitted with such a partition is shown in FIGURE 2. The cell of FIGURE 2 comprising porous anode 6, olefin inlet 8, cathode 9 and electrolyte 13 and electrolyte inlet 14, is the same as that shown in FIGURE 1 except that solid partition 21 is positioned in the upper section of the cell between the anode and cathode. By use of solid partition 21, the unreacted olefin and dihalo compounds exiting from the anodic region are prevented from intermixing with the gases evolved from the area of the cathode, and pass from the cell by means of line 22 after which the stream is then treated to separate any halogenated compounds from the unreacted olefin, the latter then being recycled to the anode. Electrolyte from the cathodic region is discharged from the cell by means of line 24, the electrolyte, containing soluble olefin oxide product, being discharged by means of line 26, the gaseous effluent comprising olefin oxide and hydrogen product passing through line 27 after which the hydrogen and olefin oxide are separated and recovered as products of the process.

FIGURES 3 and 4 (and FIGURE 4a) illustrate diaphragmless cells of the gravity type in which the electrodes are arranged vertically and horizontally, respectively. The cell of FIGURE 3 comprises porous anodes 31 positioned in the lower section of the cell and cathodes 32 positioned in the upper section in a substantially coaxial relationship to the lower electrodes. Electrolyte is charged to the cell by means of inlet 33 and olefin is introduced to the back of porous anodes 31 by means of line 34. Olefin reactant diffuses through the pores of the anode reacting with elemental halogen and water generated and present, respectively, at the surface thereof to form halohydrin. Simultaneously with the anodic reactions the water of the aqueous medium is electrolyzed at the surface of cathodes 32 forming hydrogen and hydroxyl ions. Cathodic electrolyte 36, being more dense than anodic electrolyte 35, flows in a downwardly direction as the anodic electrolyte moves upwardly. As the halohydrin of the anodic electrolyte contacts the hydroxyl ions of the cathodic electrolyte, olefin oxide product is formed. As in the case of the cell of FIGURE 1, aqueous electrolyte containing olefin oxide product is discharged from the cell by means of line 37, is withdrawn from the system by means of line 38 and gaseous cell effluent comprising unrecated olefin, olefin oxide product, dihalo byproduct and hydrogen is discharged by means of line 39. The gaseous effluent is subsequently sent to a separation and recovery section wherein the products are recovered and unreacted olefin separated and recycled with the fresh olefin stream to the cell. In the cell shown in FIGURE 3, the anodes and cathodes are operated at the same current density. This same type of cell also may be operated with the electrodes at different current densities. For example, when one of the electrodes designated by the numeral 32 is connected to an anode terminus instead of a cathode terminus, this anode, in addition to anodes 31, are operated at a lower current density than the remaining cathode positioned in the upper section of the cell. Similarly, the cell may be operated with the cathodes at a lower current density.

The cell of FIGURE 4 illustrates a gravity type cell in which the electrodes are disposed horizontally. Inasmuch as the cathodic electrolyte is more dense than the anodic electrolyte, cathode 43 in the form of a foraminous metal is positioned above porous anode 41. The cell is operated in much the same fashion as the gravity or density cell of FIGURE 3, olefin being introduced to the back of porous anode 41 by means of inlet 42 and aqueous electrolyte being fed to the cell through inlet 44. Aqueous electrolyte containing olefin oxide product is discharged from the cell by means of line 46 and gaseous effluent comprising olefin oxide product, unrecated olefin, dihalo byproduct and hydrogen is evolved from the cell by means of line 47.

Also included within the scope of the present invention is the use of a series of cells of the type illustrated by FIGURE 4A positioned one above the other. When the cells are so arranged in a stacked arrangement, they are electrically insulated (49) from each other and anodes 41 and cathodes 43 are interconnected by bus bars 40 and 45, respectively. In addition, electrolyte is fed to each of the cells from common manifold 44a through individual inlets 44 and electrolyte is discharged from each of the cells into common manifold 46a by means of individual outlets 46. Similarly, olefin is charged to each porous anode from a common manifold 42a through individual inlets 42, and gaseous effluent from each of the cells is allowed to pass into common outlet 47a by means of individual outlets 47.

FIGURE 5 of the accompanying drawings typically illustrates a diaphragm cell comprising cathode 55 and porous anode 51, and a diaphragm represented schematically by numeral 54 which separates the anode and cathode compartments containing anolyte 50 and catholyte 48, respectively. The diaphragm is composed of any suitable permeable or porous inert material such as, for example, asbestos, Teflon, polyethylene, etc. In operation, aqueous electrolyte medium is introduced to the vicinity of the anode by means of line 53, gaseous olefin is introduced to the cell by means of inlet 52 to the hollow back of porous anode 51. The olefin diffuses through the pores of the anode and reacts at the anolyte-olefin interface. Anolyte 50 containing the halohydrin intermediate migrates through the diaphragm and reacts in catholyte 48 to form olefin oxide product. Catholyte containing dissolved olefin oxide product is discharged from the cell by means of outlet 57 and is passed therefrom by means of line 58. Gaseous effluent comprising olefin oxide and hydrogen evolved from the catholyte exit from the cell by means of outlet 59. Gases discharged from the anode compartment or anolyte comprise olefin and dihalo compound and exit from anolyte 50 by means of line 56.

Another diaphragm type cell is illustrated by accompanying FIGURE 6 comprising porous anode 61, a cathode in the form of a foraminous metal 67 having diaphragm 66 in association therewith. Positioned between anode 61 and diaphragm 66 are anodic particles of materials which may be inert or conductive and are preferably conductive such as metals, magnetite or graphite (63), the particles (e.g., chunks) being introduced to the cell when required through inlet 73 having any suitable feeding device thereon illustrated by funnel 72. Aqueous electrolyte medium is introduced to the cell by means of inlet 64 in an amount sufficient to immerse the anodic particles, and olefin is introduced to the hollow back section of porous anode 61 by means of inlet 62. The advantage of this type of cell is that the anodic particles provide a large reactive anodic surface for the halohydrin forming reaction and provide a means whereby used anodes can be utilized to advantage. In the type of cell illustrated by FIGURE 6, vapors of olefin oxide and hydrogen evolve from the cathode compartment or catholyte 69 by means of line 76, and unreacted olefin and dihalo by-product evolved from the anode compartment or anolyte 68, exit from the cell by means of line 74, aqueous electrolyte containing dissolved olefin oxide product being discharged from the cell by means of outlet 71.

Another improved apparatus in which the process of this invention is effected is illustrated by FIGURE 7 of the accompanying drawings. This cell comprises hollow porous anodes 81 to which olefin reactant is charged by means of inlet 82, cathodes comprising foraminous metal 83 having diaphragm 84 in association therewith. The anodes are interconnected by means of bus bars 88 fitted through the upper hollow neck portion 86 of the anodes and are held in place by any suitable means such as bolts. Similarly, the cathodes are interconected by means of bus bars 89 which are also slidably received through the upper hollow neck portion 87 of the cathodes and are held in position by any suitable means such as bolts. Positioned between the anodes and cathodes are electrode spaces 91. Aqueous electrolyte medium is charged to the cell from manifold 92 which leads into the space maintained between the anodes and cathodes by spaces 91. Gaseous olefin reactant is charged to the inner hollow section 93 of anodes 81 from manifold 82, the olefin diffusing through the pores of the porous anode surface 81 and into the aqueous electrolyte medium or anolyte 96. As the halohydrin product forms, it passes through diaphragm 84 and cathode screen 83 and into cathode compartment or catholyte 94 wherein the olefin oxide product is formed. Excess and unreacted olefin and any dihalo by-product which forms in anolyte 96 is discharged therefrom by means of line 97. Gaseous effluent evolved from catholyte 94 comprising hydrogen and vapors of olefin oxide product are discharged from the cathode compartment by means of outlet 98. Aqueous electrolyte containing soluble olefin oxide product is conveniently discharged from the cathode compartments by means of outlet 99.

FIGURE 8 illustrates a three-sectioned cell in which the process of this invention may be effected. The cell comprises in combination: (A) an upper section or dome 106 having electrolyte inlet 107 positioned therein and outlet 108 by means of which unreacted olefin and any dihalo by-product exit from the cell, the upper section being connected to the middle section of the cell by any suitable means; (B) the middle or cathode section which comprises formaminous cathode 109 and diaphragm 111 deposited on the foraminous cathode, the middle section also being provided with outlet 112 by means of which hydrogen and vapors of olefin oxide pass from the cathode compartment, and outlet 113 by means of which aqueous electrolyte containing any soluble olefin oxide product is discharged from the cathode compartment; and (C) the bottom section which comprises the base of the cell connected to the middle section by any suitable means and is fitted with porous anodes 114 and current distribution grids 116 (wires, bars or casted base) which are fastened and attached to anode terminus 117, manifold 118 being positioned in the lower section by means of which olefin reactant is introduced to the inner hollow portion of the anode. The upper section (A) and lower section (C) of the cell are composed of or coated with an electrically non-conductive material and may be, for example, cement or coated metals, whereas the middle section (B) is made of an electrically conductive material such as steel or other metal. This type of cell is readily assembled and disassembled which feature is particularly advantageous when it becomes necessary to clean the cell, replace component parts, and electrodes, etc. In this type of cell the gaseous effluent streams from the catholyte and anolyte are prevented from intermixing, thereby facilitating subsequent recovery of unreacted olefin and of olefin oxide and hydrogen products.

Figure 9:
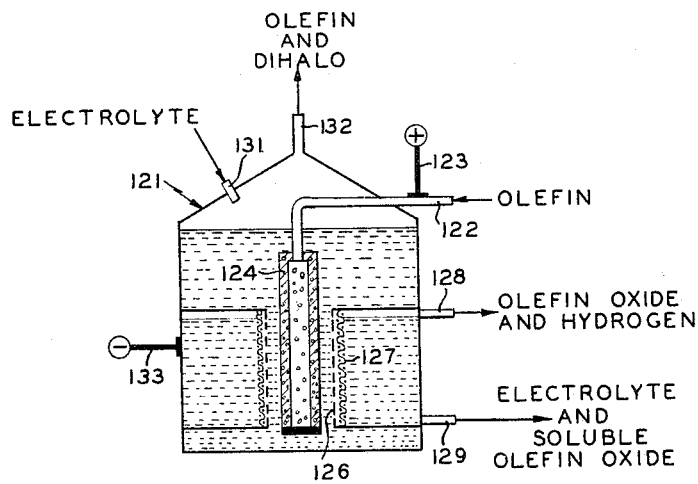

A modification of the three-sectioned cell of FIGURE 8 is illustrated by FIGURE 9. The cell of FIGURE 9 is essentially a two-sectioned cell comprising dome section 121 having anode terminus 123 thereon, and lower section having cathode terminus 133. The dome section also has positioned therein electrolyte inlet 131 and olefin inlet 122 by means of which olefin reactant is introduced to the hollow interior of porous anode 124. The cathodes are of the type illustrated in FIGURE 8 and comprise foraminous metal 127 having diaphragm 126 overlaid thereon. Electrolyte containing soluble olefin oxide product or catholyte is discharged by means of line 129 and a gaseous effluent stream comprising hydrogen and olefin oxide exits from the catholyte by means of outlet 128. Unreacted olefin and any dihalo product is discharged from the cell as a separate effluent stream by means of exit 132 positioned in the dome of the cell.

Figure 10:
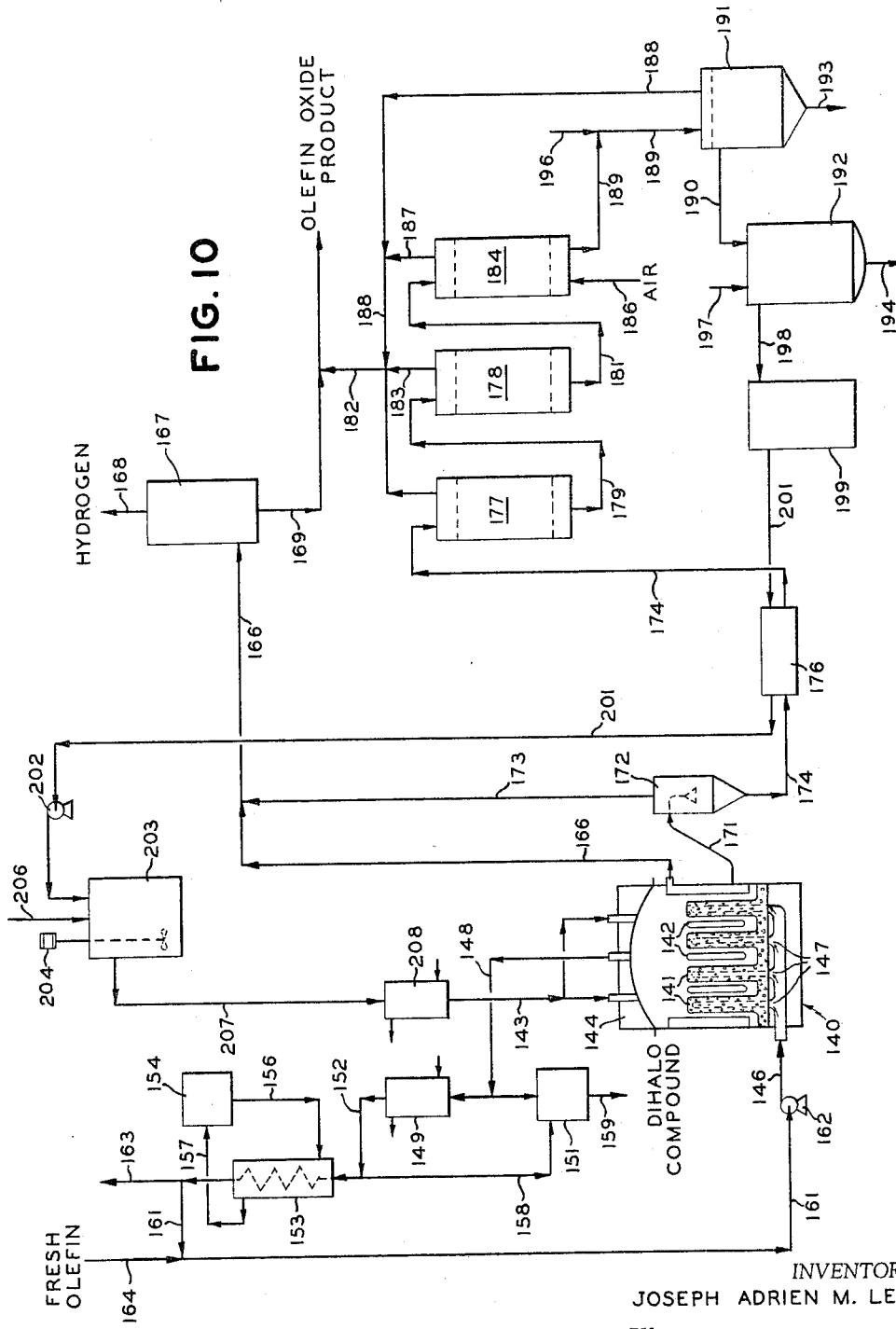
FIGURE 10 illustrates in schematic form a flow scheme and suitable arrangement of apparatus for carrying out the process of this invention.

FIGURE 10 illustrates in schematic form a flow scheme and suitable arrangement of apparatus for carrying out the process of this invention. For the purpose of convenience the following discussion of this flow scheme is based on the production of propylene oxide from propylene as the olefin and the use of aqueous sodium chloride (brine) as the aqueous electrolyte medium. Electrolytic cell 140 is of the three-sectioned type illustrated by FIGURE 8, above, except that the cell contains a plurality of porous anodes 141 and cathodes 142, the cathodes comprising a foraminous ferrous metal having a diaphragm deposited thereon as shown in greater detail in FIGURE 8. Cell 140 is charged with aqueous brine by means of inlet 143 positioned within dome 144, the electrolyte flowing downwardly around the outer porous surface of anodes 141. Propylene reactant is introduced to the inner hollow sections of anodes 141 by means of inlet 146 which feeds into olefin manifold 147 positioned within the lower section of the cell with individual inlets leading to the interior of the porous anodes. Electrolytic cell 140 is operated in accordance with the teachings and under the conditions of the process of this invention and as typically exemplified by the specific examples described herein. The propylene chlorohydrin which forms in the anolyte passes through the diaphragm and foraminous cathode into the catholyte wherein it is converted to propylene oxide product. Unreacted propylene and the dichloro derivative of propylene evolve from the anolyte and pass from the cell by means of outlet 148, positioned in dome 144. This mixture of propylene and dichloroderivative are then subjected to separation. For example, the gaseous mixture is passed through water cooled condenser 149 wherein the major part of the dichloro byproduct condenses, the condensate being recovered in receiver 151. Gaseous overhead comprising propylene and residual dichloropropylene is passed from condenser 149 by means of line 152 and is passed through further purification zone 153 wherein the gaseous stream is cooled to about −49° C., for example, by means of any suitable coolant such as Freons circulating between coolant reservoir 154 and cooling zone 153 by means of lines 156 and 157. In zone 153 any residual dichloro byproduct is separated and passed therefrom by means of line 158 to receiver 151, propylene dichloride being withdrawn from the system by means of line 159. The purified propylene is then recycled to the electrolytic cell by means of line 161 having pump 162 thereon by means of line 146, venting propylene, if desired, by means of line 163 and adding fresh propylene to the recycled feed via line 164.

The gaseous mixture of propylene oxide and hydrogen product which forms in the cathode compartments, exits from the catholyte by means of line 166 which is connected to the middle or cathode section of cell 140, and is passed to a separation zone wherein hydrogen is recovered from the propylene oxide product. This is accomplished, for example, by pasing the gaseous mixture of propylene oxide and hydrogen through a condensing zone designated by numeral 167, hydrogen being recovered as overhead product therefrom by means of line 168. Propylene oxide condensate is recovered from zone 167 by means of line 169.

Aqueous catholyte is withdrawn from cell 140 by means of outlet 171 and is passed through breaker 172 to break the flow of brine and thereby minimizing current leakage. Additional gaseous effluent comprising propylene oxide product and some hydrogen is evolved from the electrolyte in breaker 172 and is passed therefrom by means of line 173 and is conveniently combined with the gaseous oxide and hydrogen products passing through line 166 and subsequently treated as shown to separate hydrogen from propylene oxide product. The electrolyte is then passed through heat exchanger 176 by means of line 174 and is passed to a separation zone to recover dissolved propylene oxide product. As shown in FIGURE 10, the separation zone comprises vacuum operated flash towers 177 and 178, the electrolyte passing from line 174 into flash tower 177, line 179 and into second flash tower 178. Overhead from tower 177 consisting essentially of propylene oxide product is passed through line 182 and conveniently combined with propylene oxide product recovered from the gaseous cell effluent flowing through line 169. Propylene oxide overhead from tower 178 is removed therefrom by means of line 183 and is similarly passed into line 182 and thence into line 169. In order to recover residual amounts of propylene oxide from the electrolyte, the aqueous medium from flash tower 178 is passed therefrom by means of line 181 into stripping zone 184 in which air or hydrogen, introduced via line 186, is used as the stripping gas. Additional propylene oxide thereby separated is passed into line 188 and thence into lines 182 and 169. Also included within the scope of this invention is the passage of overhead from towers 177, 178 and 184 into line 166 for separation and recovery of any residual hydrogen contained therein. After the electrolyte has been treated to recover product, it is passed from stripping zone 184 by means of line 189 through brine concentrator 191 for settling and concentration tank 192, zones 191 and 192 being interconnected by line 190. In each of zones 191 and 192, sludge is removed from the electrolyte by means of lines 193 and 194, respectively, adding water as required to each by means of lines 196 and 197, respectively.

As noted above, olefin glycol may build up in the recirculating electrolyte and thus it becomes desirable to treat the electrolyte intermittently to remove glycol. This is accomplished by passing the electrolyte from zone 192 by means of line 198 through separation zone 199 in which glycol is separated by extraction or fractional distillation. The purified electrolyte is then passed through line 201 having pump 202 thereon and heat exchanger 176 wherein the purified electrolyte picks up heat from the electrolyte passing therethrough by means of line 174. The aqueous electrolyte is then passed to header tank 203.

As noted above, when the process of this invention is carried out in a diaphragm type cell, as is cell 140 of FIGURE 10, the anolyte is usually acidic and the catholyte is alkaline. The fresh aqueous electrolyte and the recycled aqueous medium may be alkaline but should not be so alkaline as to cause the anolyte to become alkaline. In view of the fact that hydroxyl ion is formed in the cathode compartment of catholyte, the alkalinity of the aqueous medium tends to increase with prolonged operation and thus it may be necessary to adjust the hydroxyl ion concentration of the recirculating aqueous electrolyte intermittently by the addition of a suitable acidic compound to avoid the introduction of recycled aqueous medium of excessively high alkalinity to the anolyte. When the recirculating electrolyte does become excessively alkaline, it is treated before being re-introduced into the electrolytic cell to adjust the hydroxyl ion concentration thereof. This is conveniently accomplished, for example, by treating the aqueous medium flowing through header tank 203 with an acidic compound such as hydrochloric acid, for example, added to the electrolyte via line 206, tank 203 being fitted with any suitable means of agitation such as stirrer 204. The electrolyte is then passed through heater 208 by means of line 207 and thence into cell inlet 143 for reuse within the cell. As discussed above, the sodium chloride is regenerated within the cell and thus it is only necessary to add additional sodium chloride to the electrolyte to make up for any losses due to formation of chlorinated side products or removal of sludge.

In accordance with a further embodiment of the present invention, the electrolytic cell of the type illustrated by FIGURES 1–10, above, is used in combination with a hydrogen-oxygen fuel cell to generate electrical energy as a partial source of power to the electrolytic cell. In accordance with this embodiment of the present invention the electrolytic cell is operated as described above to generate olefin oxide and hydrogen. After separation from the olefin oxide, the hydrogen is then passed to a fuel cell in combination with the electrolytic cell wherein it is brought into the proximity of the anode while an oxygen-containing gas such as molecular oxygen or air is brought into the proximity of the cathode, such fuel cell usually containing an aqueous medium. In this manner electrical energy expended during operation of the electrolytic cell is recovered and the power required from an external source is reduced.

In accordance with another embodiment of the present invention, the process is effected in a chlorine electrolytic cell in which flowing amalgam is used as the cathode. This embodiment is illustrated by the accompanying FIGURES 11 and 12 which illustrate the use of a vertical and horizontal amalgam cell, respectively.

Figure 11:
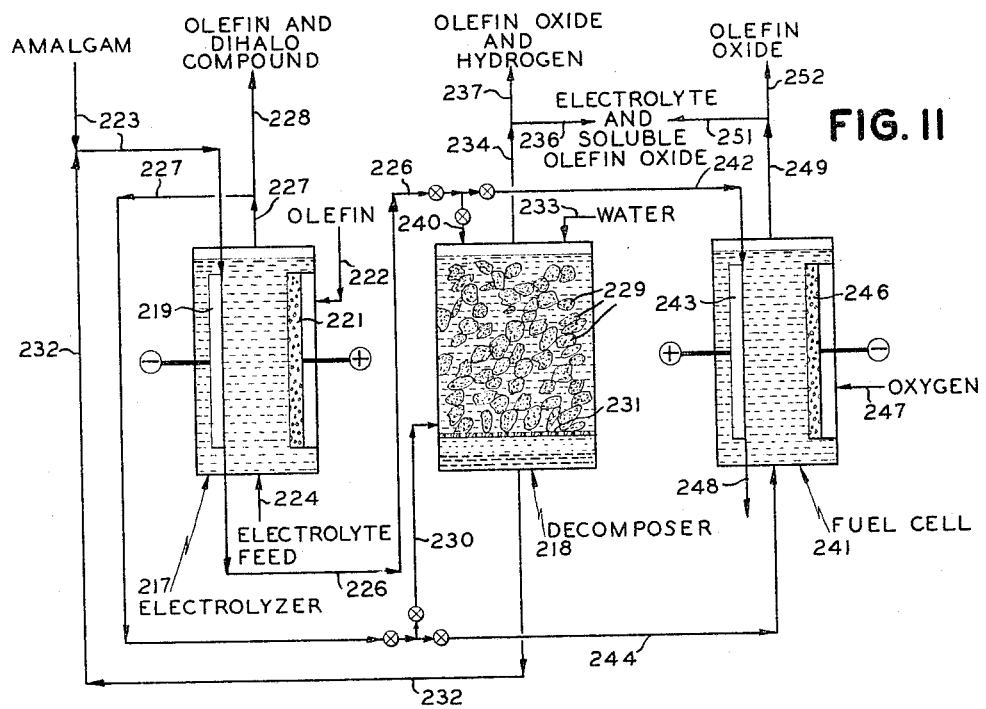
FIGURES 11 and 12 are longitudinal views in elevation of an electrolytic cell and decomposer of the vertical and horizontal type, respectively, in which the process of this invention may be effected.

FIGURE 11 shows electrolyzer 217 in which amalgam is used as the cathode means, in combination with amalgam decomposer or denuder 218 in further combination with amalgam-oxygen fuel cell 241. In accordance with the process illustrated by FIGURE 11, depleted and dilute amalgam containing about 0.05 weight percent of amalgamated metal such as sodium or other alkali metal or alkaline earth metal, is charged to electrolytic cell 217 by means of line 223 such that the amalgam flows downwardly along the surface of cathode distributing means 219 which is usually composed of a metal such as steel or nickel. The term "depleted amalgam" as used herein defines an amalgam which contains no less than the minimum amount required to wet the surfaces of the electrode with which it is brought into contact. For example, when using a sodium amalgam, a minimum of from about 0.02 to about 0.3 weight percent sodium is required before the amalgam has sufficient wettability properties to wet a steel electrode surface.

Also introduced to electrolyzer 217 are an aqueous electrolyte solution such as an aqueous solution of sodium chloride, for example, by means of line 224, and olefin reactant which is fed to the back of porous anode 221 by means of line 222. As the amalgam flows downwardly along the surface of cathode 219 the electrolyte such as sodium chloride is electrolyzed to generate elemental halogen at the surface of porous anode 221 and the metal ion of the electrolyte is reduced electrochemically at the surface of cathode 219 forming the flowing amalgam cathode. The enriched amalgam is discharged from the cell by means of line 226. At the same time, the halohydrin derivative of the olefin is formed at the surface of anode 221 and usually some byproduct dihalo compound is also generated. Electrolyte, containing the halohydrin compound, is withdrawn from electrolyzer 217 by means of line 227, gaseous effluent comprising unreacted olefin and dihalo byproduct being withdrawn by means of line 228. The enriched amalgam passing through line 226 is charged to decomposer or denuder 218 by means of line 240. Electrolyte containing the halohydrin compound flowing through line 227 is also introduced to decomposer 218 by means of line 230. As shown in FIGURE 11, decomposer 218 is filled with chunks of graphite 229 supported on supporting grid plate 231. As the amalgam from line 240 passes downwardly over the particles of graphite in the presence of the aqueous medium contained in decomposer 218, the amalgam reacts therein forming metal hydroxide such as sodium hydroxide when the amalgamated metal is sodium. The aqueous electrolyte from electrolyzer 217 and containing the halohydrin derivative of the olefin reacts with the resulting alkaline medium in decomposer 218 such that the halohydrin compound is converted to olefin oxide product. Depleted amalgam falls by gravity through perforated plate 231 and is withdrawn from the bottom of decomposer 218 by means of line 232 and is recycled to electrolyzer 217 wherein it is re-used as the cathode. Water is added as required to decomposer 218 by means of inlet 233.

Electrolyte containing soluble olefin oxide is withdrawn from decomposer 218 by means of outlet 234, and is passed from the system by means of line 236. Gaseous effluent from decomposer 218 containing olefin oxide and hydrogen which is evolved in the decomposer, are recovered by means of line 237 and subjected to subsequent separation as described above to recover the oxide and hydrogen.

Instead of, or in addition to, passing the enriched amalgam and the halohydrin-containing aqueous medium produced in electrolyzer 217 to decomposer 218, they may be passed to fuel cell 241 in which the halohydrin compound is converted to olefin oxide product, and the amalgam is used in combination with oxygen to generate electrical energy as a partial source of power to electrolyzer 217. This is accomplished, for example, by closing the valve on line 240 and opening the valve on line 242, and allowing the amalgam flowing through line 226 to pass into line 242 and thence into fuel cell 241. In fuel cell 241, the amalgam passes downwardly along the surface of anode 243 which is usually composed of steel. At the same time, the aqueous electrolyte from electrolyzer 217 and flowing through line 227 is passed into line 244 and thence into fuel cell 241 by proper adjustment of the valves on lines 230 and 244. Fuel cell 241 also has vertically disposed therein porous gas diffusion cathode 246. Oxygen or air is introduced to the back of gas diffusion cathode 246 by means of line 247, the oxygen diffusing through the pores of the cathode and reacting with the water thereby generating hydroxyl ion. As the cathodic reaction takes place, the amalgamated metal of the amalgam flowing downwardly along the surface of anode 243, is oxidized electrochemically to form metal ions. The fuel cell is operated at a temperature between about room temperature (about 68° F.) and the boiling point of the electrolyte which is usually about 220° F. Depleted amalgam is withdrawn from the fuel cell by means of line 248 and is conveniently recycled to electrolyzer 217 for reuse therein as the cathode. Olefin oxide product is formed by the reaction of the halohydrin derivative of the olefin with the alkaline medium generated within the fuel cell. Electrolyte containing soluble olefin oxide is withdrawn from fuel cell 241 by means of line 249 and is discharged from the system via line 251. Gaseous olefin oxide is recovered by means of line 252. In accordance with this embodiment of the present invention, hydrogen is not produced by the electrochemical reactions taking place within fuel cell 241, but instead electrical energy is produced which is then used as a partial source of power required for the electrochemical reactions which take place within electrolyzer 217.

Figure 12:
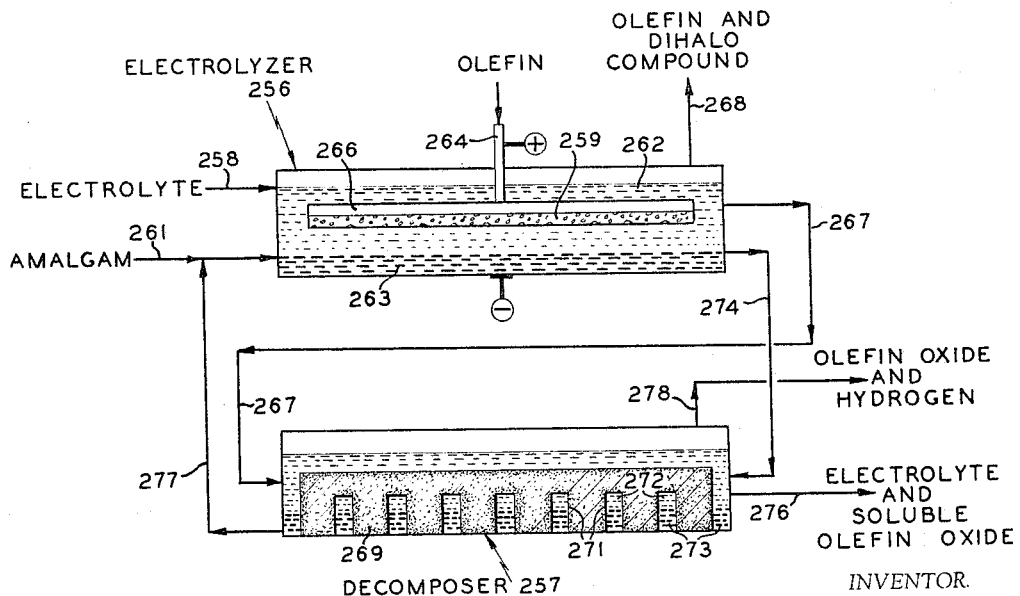

FIGURE 12 illustrates a horizontal amalgam chlorine cell or electrolyzer 256 in combination with horizontal decomposer 257. In using this type of system aqueous medium 262 containing a metal halide electrolyte such as sodium chloride, for example, is charged to electrolyzer 256 by means of line 258, electrolyzer 256 being fitted with porous anode 259 disposed horizontally across the cell. Amalgam 263, introduced to the cell by means of line 261, flows along the bottom of the cell and is in electrical contact with the cathode terminus. Olefin reactant is fed to porous anode 259 by means of inlet 264 which leads into the back hollow portion 266 thereof. As in FIGURE 11, the halohydrin derivative of the olefin is formed in the vicinity of the anode and is contained in the aqueous electrolyte which is withdrawn from the cell by means of line 267 and passed to decomposer 257. Unreacted olefin and any dihalo byproduct is discharged from electrolyzer 256 by means of line 268. As shown in FIGURE 12, decomposer 257 contains a solid conductor 269 such as graphite or iron having channels 271 therethrough through which aqueous electrolyte 272 and amalgam 273 flow. Enriched amalgam 263 from electrolyzer 256 is passed therefrom by means of line 274 and is charged to decomposer 257. Within decomposer 257 the amalgamated metal such as sodium is converted to metal ions and hydroxyl ions are also formed rendering the medium within the decomposer alkaline, and generating hydrogen. The halohydrin derivative of the olefin reacts with the alkaline medium forming olefin oxide. Electrolyte containing soluble olefin oxide is withdrawn from decomposer 257 by means of line 276 and depleted amalgam is withdrawn from the decomposer by means of line 277 and is recirculated to electrolyzer 256 for reuse therein as the cathode. Gaseous olefin oxide and hydrogen are discharged from the decomposer by means of line 278.

Also included within the scope of this invention is the combination of amalgam-oxygen fuel cell 241 of FIGURE 11 with the horizontal amalgam electrolytic cell and decomposer illustrated by FIGURE 12. In accordance with this modification of the process of FIGURE 12, amalgam flowing through line 274, and electrolyte containing halohydrin flowing through line 267, are passed to the amalgam-oxygen fuel cell as described above in connection with FIGURE 11. It is to be further understood that a vertical electrolyzer such as that illustrated in FIGURE 11 can be used in combination with a horizontal decomposer such as that shown in FIGURE 12. Likewise the process of this invention can be conducted utilizing a horizontal electrolyzer in combination with a vertical decomposer.

Various alterations and embodiments of the process and apparatus illustrated by FIGURES 1–12 may become apparent to those skilled in the art without departing from the scope of this invention. For example, although the vertically disposed anodes of FIGURES 1–3 and 5–11 are shown as porous anodes with olefin being fed through the pores thereof, the anode also may be solid or non-porous and olefin feed bubbled upwardly along the outer surface thereof in open and direct contact with the electrolyte in the vicinity of the anode. However, the porous anodes are usually preferred due to the fact that a higher reactive surface and greater number of reaction sites are thereby provided for the halohydrin forming reaction.

The term "anode" as used herein defines the electrode at which electrons are released to effectuate electrochemical oxidation and is indicated by a plus (+) sign in the figures of the accompanying drawings. The term "cathode" as used herein defines the electrode at which electrochemical reduction occurs and is indicated by a negative (−) sign in the figures of the accompanying drawings.

The following examples are offered as a further understanding of the process of this invention and are not to be construed as unnecessarily limiting thereto.

*Example 1*

The electrolytic cell employed in this example was a diaphragmless cell constructed of Plexiglas and was of the type illustrated by the accompanying FIGURE 2. Positioned within the cell were a porous anode composed of dense graphite and a cathode in the form of a stainless steel screen. In carrying out this experiment aqueous sodium chloride was fed from an electrolyte reservoir through a flow meter and preheater and was charged to the bottom of the electrolytic cell in the vicinity of the anode with upward flow. Ethylene was employed as the olefin reactant and was fed to the cell in the presence of nitrogen as a diluent gas, the gaseous mixture being introduced through the back of the porous anode. Effluent gases from the anode section of the cell were separated from the aqueous sodium chloride solution in a gas-liquid separator positioned at a given height to maintain constant pressure on the cell. The gaseous stream from the anode was passed through a caustic soda scrubber to remove any chlorine, a cold trap to condense dichloroethylene, a gas sampling tube and a wet test meter. The aqueous sodium chloride solution was discharged into a collecting reservoir at the end of the experiment. Gaseous effluent from the catholyte was passed through a series of scrubbers containing 0.1 normal hydrochloric acid saturated with magnesium chloride to remove any ethylene oxide product, a Dry Ice trap to condense byproducts, a gas sampling tube and a wet test meter. During the course of this experiment, the electrolyte was analyzed periodically to measure the concentration of the chlorine and to record the pH. The conditions under which this experiment was conducted included: an ethylene flow rate of 80 cc. per minute, the ethylene: nitrogen mole ratio being 1.1; the use of aqueous sodium chloride solution containing 131 grams per liter of sodium chloride introduced to the cell at a rate of 77 cc. per minute, the pH of this aqueous feed solution being 10.6. The cell was operated at a temperature of 100° F. for 60 minutes at a current density of 100 amperes per square foot of apparent electrode surface. The pH of the anodic electrolyte at the end of the run was 7.7, and that of the exit brine solution from the region of the cathode was 11.7. It was found that no chlorine exited from the vicinity of the anode, the gaseous effluent from the anode consisting of unreacted ethylene. The chlorine efficiency of the cell was 100 percent, and the hydrogen efficiency was 99 percent, 0.185 mole of hydrogen having been produced. Under these conditions the total organic product yield was 25.7 percent, of which about 25.2 percent was ethylene oxide. Partial work-up of the electrolyte by simple fractional distillation at 25–27 inches mercury pressure and about 40–45° C. yielded 48 percent ethylene oxide, the remainder of the organic product being predominantly oxide (about 50 percent) and containing a small amount of dichloroethylene (about 2 percent).

*Example 2*

The electrolytic cell employed in this example was of the gravity type illustrated by FIGURE 3 of the accompanying drawings, and was constructed of Plexiglas. In carrying out this experiment aqueous sodium chloride was fed from a reservoir through a flow meter and preheater and was charged to the bottom of the electrolytic cell. Positioned in the lower section of the cell were two vertical porous carbon anodes and positioned in the upper section of the cell were two corrugated vertical stainless steel cathodes positioned in coaxial relationship to the anodes. Ethylene was fed to the cell through the back of each of the porous anodes, diffusing through the pores thereof and into the anodic electrolyte. Ethylene chlorohydrin forms in the anodic electrolyte, hydroxyl ions being formed in the cathodic electrolyte. The conditions under which this experiment was conducted included: an ethylene flow rate of 72 cc. per minute; the use of aqueous sodium chloride solution, containing 131 grams per liter of dissolved sodium chloride and having a pH of 1.8, introduced to the cell at a rate of 65 cc. per minute, the pH of the exit aqueous electrolyte solution being 9.2. The cell was operated at a temperature of 150° F. for 2 hours at a current density of 50 amperes per square foot of apparent electrode surface. Under these conditions the total organic product yield was 32 percent.

*Examples 3–16*

In this series of experiments propylene was employed as the olefin reactant and the reactions were carried out in a diaphragm cell using an aqueous solution of sodium chloride (brine) having a pH of 11 as the electrolyte. Vertically disposed in the cell were a porous carbon anode and a cathode in the from of a stainless steel screen having a diaphragm deposited thereon. The diaphragm was a long-fiber asbestos paper having a thickness of 0.025 inch. The apparent area of the electrodes was about 0.16 to 0.18 square foot. In the start-up of each of these runs 3–16, the aqueous electrolyte was allowed to flow from a heated header tank, which was maintained full by a pumping system, through a rotameter and into a regulated preheater. When the brine reached the operating temperature, it was introduced to the cell through the upper part of the anode compartment and passed through the asbestos paper diaphragm into the cathode chamber. After exiting from the cathode chamber, the brine was passed through a heat exchanger into a gas-liquid separator. The gas from the separator was combined with the gaseous effluent from the catholyte, and the liquid was flowed through a pH measuring device and collected in a graduated vessel. Once the brine flow was established the flow of propylene gas through the porous carbon anode into the anode compartment was started. Excess olefin evolved from the cell in the gaseous anode overhead. Current was then applied and electrolysis of the brine started. Volatile and gaseous products produced in the anode compartment evolved from the anolyte in the anode overhead which was passed through a heat exchanger, a sampling port and into a cold trap. In runs 3–8, the cold trap was a water cooled condenser; in runs 9–16, the cold trap was maintained at −40° C. and product not collected in the cold trap was flowed through another gas sampling port to a gas meter. The dichloro derivative of propylene so collected was then analyzed to determine the amount produced. Volatile and gaseous products produced in the cathode compartment and present in the cathode overhead were allowed to flow through a gas sampling port, a heat exchanger and into a Dry Ice cold trap. Volatile materials not collected in the cold trap were flowed through another gas sampling port to a gas meter. The gaseous product so collected was then analyzed to determine the amount of propylene oxide and hydrogen recovered from the gaseous effluent from the cathode compartment. In each of Examples 3–15, the temperature of the aqueous brine solution was 125° F. and the run was conducted for 4 hours except run 3 which was conducted for 3 hours. In Example 16, the brine solution was at a temperature of 160° F. and the duration of the run was 4 hours. The other operating conditions and results of runs 3–16 are set forth in Table I below.

At the end of each of the runs of Table I, the anolyte remaining in the cell was analyzed for propylene chlorohydrin. In each case a low value was obtained, the average chlorohydrin content remaining in the anolyte being about 0.01 mole. In Table I, therefore, the value set forth for "total organic product produced" includes the sum of the stated number of moles of propylene oxide and dichloropropylene ($C_3H_6Cl_2$) produced as well as 0.01 mole to account for the propylene chlorohydrin remaining in the anolyte. The gaseous effluent and electrolyte were also analyzed to determine the presence, if any, of propylene glycol and ether (e.g., dichloroisopropyl ether). In each run it was found that only negligible amounts (less than 0.01 weight percent) of glycol and ether were formed, i.e., amounts not measurable by gas chromotographic analysis.

The values given in Table I for "theoretical organic product" is defined as 95 percent of one-half of the number of Faradays for the given run, the average chlorine efficiency of the cell being about 95 percent. The values for the yields of total organic product, propylene oxide and dichloropropylene are the respective ratios of the total organic product produced, total propylene oxide and total dichloropropylene to the theoretical organic product, expressed in terms of percent. The values set forth in Table I for the selectivity in which the propylene oxide was produced, are the ratios of total propylene oxide to the total organic product produced, expressed in terms of percent. The yield of hydrogen obtained in each of Examples 3–16 was approximately 100 percent.

electrolyte solution to the cell and for recovering products was also substantially the same as employed in Examples 3–16, except that the hydrogen-containing gaseous effluent from the cathode compartment, after passing through the Dry Ice cold trap, was collected by displace-

TABLE I.—ELECTROCHEMICAL PRODUCTION OF PROPYLENE OXIDE

| Run Number | 3 | 4 | 5 | 6 | 7 | 8 | 9 |
|---|---|---|---|---|---|---|---|
| Operating Conditions: | | | | | | | |
| Electrolyte Feed (aqueous sodium chloride): | | | | | | | |
| NaCl, grams/liter | 90 | 122 | 122 | 123 | 82 | 88 | 86 |
| Feed Rate, cc./min | 37 | 32 | 31 | 33 | 26 | 29 | 29 |
| Olefin (propylene): | | | | | | | |
| Feed Rate, cc./min | 340 | 165 | 325 | 612 | 495 | 230 | 340 |
| Needed for stoichiometry, cc./min | 75 | 98 | 112 | 112 | 98 | 98 | 88 |
| Applied current, amperes | 11 | 14 | 16 | 16 | 14 | 14 | 12.5 |
| Current density, amps./ft.$^2$ | 70 | 90 | 90 | 90 | 90 | 79 | 70 |
| Faradays | 1.23 | 2.09 | 2.39 | 2.39 | 2.09 | 2.09 | 1.87 |
| Cell voltage, volts | 3.35 | 3.8 | 4.0 | 3.9 | 3.7 | 3.75 | 3.5 |
| Total $Cl_2$ in spent brine, eq./liter | 0.002 | 0.048 | 0.001 | 0.000 | 0.000 | 0.004 | 0.008 |
| Hydroxyl concentration in spent brine, eq./liter | 0.19 | 0.094 | 0.079 | 0.061 | 0.058 | 0.051 | 0.025 |
| Propylene Feed Conversion | 22 | 58 | 38 | 20 | 23 | 40 | 26 |
| Products, moles: | | | | | | | |
| Hydrogen | 0.62 | 1.15 | 1.25 | 1.27 | 1.08 | 1.04 | 0.93 |
| Total Propylene Oxide | 0.54 | 0.70 | 1.00 | 1.00 | 0.85 | 0.73 | 0.73 |
| In overhead from cathode | 0.07 | 0.12 | 0.16 | 0.15 | 0.13 | 0.12 | 0.09 |
| In brine | 0.47 | 0.58 | 0.84 | 0.85 | 0.72 | 0.61 | 0.64 |
| Total dichloropropylene | 0.01 | 0.30 | 0.13 | 0.01 | <0.01 | 0.07 | 0.11 |
| Total organic product produced | 0.56 | 1.01 | 1.14 | 1.02 | 0.86 | 0.81 | 0.85 |
| Theoretical organic product | 0.58 | 0.99 | 1.14 | 1.14 | 0.99 | 0.99 | 0.89 |
| Yields, percent: | | | | | | | |
| Total organic product | 97 | 102 | 100 | 90 | 87 | 82 | 96 |
| Propylene oxide | 93 | 71 | 88 | 88 | 86 | 74 | 82 |
| Dichloropropylene | 2 | 31 | 11 | 1 | 0 | 7 | 12 |
| Selectivity, propylene oxide | 98 | 70 | 88 | 98 | 98 | 90 | 86 |

| Run Number | 10 | 11 | 12 | 13 | 14 | 15 | 16 |
|---|---|---|---|---|---|---|---|
| Operating Conditions: | | | | | | | |
| Electrolyte Feed (aqueous sodium chloride): | | | | | | | |
| NaCl, grams/liter | 61 | 61 | 60 | 60 | 90 | 90 | 90 |
| Feed Rate, cc./min | 34 | 37 | 24 | 24 | 29 | 12 | 25 |
| Olefin (propylene): | | | | | | | |
| Feed Rate, cc./min | 340 | 525 | ¹ 200 | ² 200 | 325 | 613 | 613 |
| Needed for stoichiometry, cc./min | 88 | 88 | 88 | 88 | 88 | | 135 |
| Applied current, amperes | 12.5 | 12.5 | 12.5 | 12.5 | 12.5 | 19.5 | 16 |
| Current density, amp./ft.$^2$ | 70 | 70 | 70 | 70 | 70 | 110 | 90 |
| Faradays | 1.87 | 1.87 | 1.87 | 1.87 | 1.87 | 2.91 | 2.30 |
| Cell voltage, volts | 3.6 | 3.7 | 3.5 | 3.6 | 3.5 | 3.9 | 3.6 |
| Total $Cl_2$ in spend brine, eq./liter | 0.002 | 0.003 | 0.001 | 0.000 | 0.003 | 0.000 | 0.000 |
| Hydroxyl concentration in spent brine, eq./liter | 0.027 | 0.041 | 0.040 | 0.040 | 0.041 | 0.168 | 0.069 |
| Propylene Feed Conversion | 26 | 18 | 24 | 19 | 27 | 21 | 16 |
| Products, moles: | | | | | | | |
| Hydrogen | 0.94 | 1.00 | 0.94 | 0.98 | 0.97 | 1.42 | 1.10 |
| Total Propylene Oxide | 0.75 | 0.77 | 0.72 | 0.75 | 0.71 | 0.94 | 0.74 |
| In overhead from cathode | 0.07 | 0.08 | 0.10 | 0.10 | 0.11 | 0.39 | 0.22 |
| In brine | 0.68 | 0.69 | 0.62 | 0.65 | 0.60 | 0.55 | 0.52 |
| Total dichloropropylene | 0.09 | 0.09 | 0.08 | 0.07 | 0.11 | 0.21 | 0.13 |
| Total organic product produced | 0.85 | 0.87 | 0.81 | 0.83 | 0.83 | 1.16 | 0.88 |
| Theoretical organic product | 0.89 | 0.89 | 0.89 | 0.89 | 0.89 | 1.38 | 1.09 |
| Yields, percent: | | | | | | | |
| Total organic product | 96 | 98 | 91 | 93 | 93 | 84 | 81 |
| Propylene oxide | 84 | 87 | 81 | 84 | 80 | 68 | 68 |
| Dichloropropylene | 10 | 10 | 9 | 8 | 12 | 15 | 12 |
| Selectivity, propylene oxide | 89 | 89 | 90 | 91 | 86 | 81 | 85 |

¹ Nitrogen introduced with propylene at rate of 100 cc./minute.
² Nitrogen introduced with propylene at rate of 200 cc./minute.

As demonstated by the results of Examples 3–16 of Table I, the process of this invention leads to the production of olefin oxide in good yield and selectivity on the basis of total organic product produced, the yield and selectivity of oxide approaching 100 percent on the basis of other oxygen-containing derivatives of the olefin. The results of Example 4 indicate that, when desired, increased yields of dihalo derivative of the olefin (e.g., propylene dichloride) which is readily separated from the oxide, are obtained at relatively low olefin feed rates or increased residence time of the olefin in the anodic region.

*Examples 17–20*

This series of examples was conducted using ethylene as the olefin reactant and the above-described diaphragm cell employed in Examples 3–16. The procedure for introducing the ethylene and aqueous sodium chloride ment of water. The ethylene dichloride, by-product evolved from the anode compartment was collected in a cold trap maintained at minus 40° C. The operating conditions and results obtained in each of these examples are given in the following Table II. The values given in Table II for the yields of total product, ethylene oxide and ethylene dichloride, and selectivity, were derived as defined above in connection with Examples 3–16, except that in runs 17–19, the values for total organic product do not include the amount of ethylene chlorohydrin remaining in the anolyte at the end of each run which is estimated as being about 0.01 mole. At the end of the run of Example 20, the anolyte was analyzed and found to contain 0.01 mole of ethylene chlorohydrin which value is included in the total organic product produced. In each instance, no oxygen-containing derivative of ethylene, other than ethylene oxide, was detected.

TABLE II.—ELECTROCHEMICAL PRODUCTION OF ETHYLENE OXIDE

| Run Number | 17 | 18 | 19 | 20 |
|---|---|---|---|---|
| Operating Conditions: | | | | |
| Electrolyte Feed (aqueous sodium chloride): | | | | |
| NaCl, grams/liter | 86.5 | 83 | 82.5 | 80 |
| Feed Rate, cc./min | 14.7 | 14.1 | 31.2 | 19.4 |
| Alkalinity, eq./liter | 0.0004 | 0.073 | 0.0097 | 0.005 |
| Olefin (ethylene), Feed Rate, cc./min | 275 | 275 | 275 | 275 |
| Applied current, amperes | 12.6 | 13.5 | 16.3 | 12.5 |
| Current density, amps./ft.$^2$ | 76 | 81 | 98 | 75.5 |
| Faradays | 1.88 | 2.01 | 1.29 | 1.86 |
| Cell voltage, volts | 3.7 | 3.6 | 3.8 | 3.6 |
| Temperature, °F | 126 | 129 | 127 | 127 |
| Time, minutes | 240 | 240 | 128 | 240 |
| Hydroxyl concentration in spent brine, moles | 0.123 | 0.112 | 0.092 | 0.088 |
| Ethylene Feed Conversion, output basis | 25.7 | 25.9 | 33.1 | 28.6 |
| Products, moles: | | | | |
| Hydrogen | 0.36 | 0.48 | 0.39 | 0.75 |
| Total Ethylene Oxide | 0.56 | 0.57 | 0.45 | 0.65 |
| In overhead from cathode | 0.07 | 0.08 | 0.07 | 0.08 |
| In brine | 0.49 | 0.49 | 0.38 | 0.57 |
| Total dichloroethylene | 0.10 | 0.12 | 0.09 | 0.11 |
| Total organic product produced | 0.66 | 0.69 | 0.54 | 0.77 |
| Theoretical organic product | 0.90 | 0.95 | 0.62 | 0.89 |
| Yields, percent: | | | | |
| Total organic product | 73 | 73 | 87 | 87 |
| Ethylene oxide | 62 | 60 | 73 | 73 |
| Dichloroethylene | 11 | 13 | 14 | 12 |
| Selectivity, ethylene oxide | 85 | 83 | 83 | 84 |

The advantages of the process of this invention are manifest and numerous. As shown by the results of the above examples, olefin or alkylene oxide product is produced in high selectivity and the formation of other oxygenated by-products such as glycols and ethers are at a minimum. The process is a direct method for producing the desired olefin oxide product within a single reaction zone. It is readily adapted to the formation of oxide of many olefins and is thus capable of meeting the demand of the market with respect to a variety of olefin oxides. The process also leads to the production of substantially pure hydrogen utilizable in the synthesis of valuable compounds such as ammonia, or as the fuel to a hydrogen-oxygen fuel cell which may be in combination with the electrolytic cell as described above.

The process of this invention offers many advantages over the prior art chlorohydrin method. For example, the handling of molecular chlorine is avoided, the chlorine being generated in situ and consumed within the electrolytic cell. A related advantage is that the electrical energy required for operation of the present process is less than that required to generate and recover molecular chlorine. In addition, there is no waste dehydrohalogenation product, the halide portion of the electrolyte being continuously regenerated within the cell. This latter advantage over the presently employed chlorohydrin process is particularly important in that the disposal of large amounts of calcium chloride byproduct into streams is avoided as is the pollution problem caused thereby.

The process of this invention also possesses advantages over catalytic direct oxidation methods in that there is such as no loss of expensive silver or other catalyst, and higher yields of olefin oxide are produced.

Various alterations and modifications of the process and apparatus of this invention may become apparent to those skilled in the art without departing from the scope of this invention.

Having described my invention, I claim:

1. A process for the manufacture of olefin oxide which comprises (a) providing an electrochemical cell containing an aqueous electrolyte medium having a metal halide dissolved therein and having at least one anode compartment and at least one cathode compartment separated by a fluid permeable diaphragm, said anode compartment having an anode therein and said cathode compartment having a cathode therein; (b) subjecting said aqueous medium contained within the cell to the action of a direct electric current to form halogen in the anolyte and hydroxyl anions in the catholyte; (c) maintaining the flow of aqueous medium within the cell from the anode compartment through the fluid permeable diaphragm into the cathode compartment; (d) introducing an olefin to the cell such that olefin is contacted with anolyte to form the corresponding halohydrin derivative of the olefin, the halohydrin being transported from the anode compartment through the fluid permeable diaphragm into the cathode compartment by the said flow of aqueous medium within the cell; (e) dehydrohalogenating the halohydrin within the cell in the catholyte to form olefin oxide therein; and (f) withdrawing effluent containing olefin oxide product from the cathode compartment and recovering olefin oxide as a product of the process.

2. The process of claim 1 in which said metal halide is a metal chloride.

3. The process of claim 1 in which said metal halide is a metal bromide.

4. The process of claim 1 in which said metal halide is an alkali metal halide.

5. The process of claim 4 in which said alkali metal is sodium.

6. The process of claim 4 in which said alkali metal is potassium.

7. The process of claim 4 in which said alkali metal is lithium.

8. The process of claim 1 in which said metal halide is an alkaline earth metal halide.

9. The process of claim 8 in which said alkaline earth metal is barium.

10. The process of claim 1 in which said olefin is a normally gaseous olefin.

11. The process of claim 10 in which said normally gaseous olefin is ethylene.

12. The process of claim 10 in which said normally gaseous olefin is propylene.

13. A process for the preparation of propylene oxide which comprises (a) providing an electrochemical cell containing an aqueous electrolyte medium comprising an alkali metal chloride and having at least one anode compartment and at least one cathode compartment separated by a fluid permeable diaphragm, said anode compartment having an anode therein and said cathode compartment having a cathode therein; (b) subjecting said aqueous medium within the cell to the action of a direct electric current to generate elemental chlorine in the anolyte and hydroxyl anions in the catholyte; (c) introducing propylene to the cell such that it is contacted with anolyte thereby forming propylene chlorohydrin; (d) maintaining the flow of aqueous medium within the cell such that the direction of flow is from the anode compartment through the fluid permeable diaphragm into the cathode compartment, the said direction of flow being maintained by introducing aqueous medium to the cell such that it is fed to the anode compartment and by withdrawing aqueous medium from the cell by withdrawal thereof from the cathode compartment; (e) transporting propylene chlorohydrin from the anode compartment through the fluid permeable diaphragm into the cathode compartment by the said direction of flow of aqueous medium within the cell; (f) dehydrochlorinating said propylene chlorohydrin within the cell in the catholyte to form propylene oxide within the cell; and (g) withdrawing effluent containing propylene oxide from the cathode compartment and recovering propylene oxide as the principal oxygenated derivative of propylene produced by the process.

14. A process for the preparation of ethylene oxide which comprises (a) providing an electrochemical cell containing an aqueous electrolyte medium comprising an alkali metal chloride and having at least one anode compartment and at least one cathode compartment separated by a fluid permeable diaphragm, said anode compartment having an anode therein and said cathode compartment having a cathode therein; (b) subjecting said aqueous medium within the cell to the action of a direct electric current to generate elemental chlorine in the anolyte and hydroxyl anions in the catholyte; (c) introducing ethylene to the cell such that it is contacted with anolyte thereby forming ethylene chlorohydrin; (d) maintaining the flow of aqueous medium within the cell such that the direction of flow is from the anode compartment through the fluid permeable diaphragm into the cathode compartment, the said direction of flow being maintained by introducing aqueous medium to the cell such that it is fed only to the anode compartment and withdrawing aqueous medium from the cell by withdrawal thereof only from the cathode compartment; (e) transporting ethylene chlorohydrin from the anode compartment through the fluid permeable diaphragm into the cathode compartment by the said direction of flow of aqueous medium within the cell; (f) dehydrochlorinating said ethylene chlorohydrin within the cell in the catholyte to form ethylene oxide within the cell; and (g) withdrawing effluent containing ethylene oxide from the cathode compartment, and recovering ethylene oxide therefrom as a product of the process.

15. A process for the preparation of an olefin oxide which comprises (a) providing an electrochemical cell containing an aqueous electrolyte medium having an alkali metal chloride dissolved therein and having at least one anode compartment and at least one cathode compartment separated by a fluid permeable diaphragm, said anode compartment having an anode therein and said cathode compartment having a cathode therein; (b) subjecting said aqueous electrolyte medium within the cell to the action of a direct electric current to generate elemental chlorine in the anolyte and hydroxyl anions in the catholyte; (c) maintaining the aqueous medium within the cell at a temperature between about 90° F. and about 200° F.; (d) maintaining a continuous flow of aqueous medium within the cell from the anode compartment through the fluid permeable diaphragm into the cathode compartment by introducing aqueous medium to the cell such that it is fed only to the anode compartment and withdrawing aqueous medium from the cell by withdrawal thereof only from the cathode compartment; (e) introducing a normally gaseous olefin to the cell such that it is contacted with anolyte thereby forming the corresponding chlorohydrin derivative of the olefin; (f) transporting the chlorohydrin from the anode compartment through the fluid permeable diaphragm into the cathode compartment by the said continuous flow of aqueous medium within the cell; (g) dehydrochlorinating the chlorohydrin to form the corresponding oxide derivative within the cell in the catholyte, the said oxide being formed as essentially the sole oxygenated derivative of the chlorohydrin; (h) withdrawing vaporous effluent containing said olefin oxide from the cathode compartment; (i) withdrawing aqueous effluent containing additional olefin oxide product from the cathode compartment; and (j) separation olefin oxide from the vaporous effluent and from the aqueous effluent and recovering olefin oxide as the principal oxygenated organic compound of the process.

16. A process for the manufacture of olefin oxide which comprises (a) providing an electrochemical cell containing an aqueous electrolyte medium having an alkali metal chloride dissolved therein and having at least one anode compartment and at least one cathode compartment separated by a fluid permeable diaphragm, said anode compartment having therein an anode comprising a porous anodic surface and having an inner hollow chamber; (b) maintaining the flow of aqueous medium within the cell such that the direction of flow is from the anode compartment through the fluid permeable diaphragm into the cathode compartment, the said direction of flow being maintained by feeding aqueous medium to the anode compartment and by withdrawing aqueous medium from the cell from the cathode compartment; (c) subjecting said aqueous medium to the action of a direct electric current to form elemental chlorine in the aqueous medium contained in the anode compartment and hydroxyl anions in the aqueous medium contained in the cathode compartment; (d) introducing a normally gaseous olefin to the inner chamber of said anode, the olefin diffusing through the porous anodic surface towards the aqueous medium in the anode compartment and reacting to form the corresponding chlorohydrin derivative of the olefin; (e) maintaining the flow of aqueous medium containing chlorohydrin from the anode compartment through the diaphragm into the cathode compartment; (f) in said cathode compartment dehydrochlorinating the chlorohydrin in the alkaline medium contained therein to form the corresponding olefin oxide, and withdrawing effluent from said cell containing olefin oxide product.

17. A process for the manufacture of olefin oxide which comprises (a) providing an electrochemical cell containing an aqueous electrolyte medium having an alkali metal chloride dissolved therein and having at least one anode compartment and at least one cathode compartment separated by a fluid permeable diaphragm, said anode compartment having therein an anode comprising a porous anodic surface and an inner hollow chamber; (b) maintaining the flow of aqueous medium within the cell such that the direction of flow is from the anode compartment through the fluid permeable diaphragm into the cathode compartment, the said direction of flow being maintained by introducing aqueous medium to the cell such that it is fed only to the anode compartment and withdrawing aqueous medium from the cell by withdrawal thereof only from the cathode compartment; (c) maintaining said aqueous medium contained within the cell at a temperature from about 90° F. to about 200° F.; (d) subjecting said aqueous medium to the action of a direct electric current to form elemental chlorine in the aqueous medium contained in the anode compartment and hydroxyl anions in the aqueous medium contained in the cathode compartment; (e) introducing a normally gaseous olefin to the inner chamber of said anode, the olefin diffusing through the porous anodic surface towards the aqueous medium in the anode compartment and reacting to form the corresponding chlorohydrin derivative of the olefin; (f) transporting the chlorohydrin from the anode compartment through the fluid permeable diaphragm into the cathode compartment by said flow of aqueous medium within the cell; (g) in said cathode compartment dehydrochlorinating the chlorohydrin in the alkaline medium contained therein to form the corresponding olefin oxide; and (h) withdrawing vaporous effluent from said cell containing olefin oxide product.

18. A process for the manufacture of olefin oxide which comprises (a) providing an electrochemical cell containing an aqueous solution of a metal halide and having an anode and cathode disposed therein; (b) subjecting said aqueous medium to the action of a direct electric current thereby generating halogen in the aqueous medium in the vicinity of the anode and hydroxyl ions in the aqueous medium in the vicinity of the cathode; (c) passing an olefin into said cell such that olefin is contacted with aqueous medium in the vicinity of the anode to form the corresponding halohydrin; (d) maintaining the flow of aqueous medium within the cell such that the direction of flow is from the anodic region towards the cathodic region of the cell, halohydrin being transported to the vicinity of the cathode by the said flow of aqueous medium; (e) reacting said halohydrin within the cell in the aqueous medium containing hydroxyl ions in the vicinity of the cathode to form the corresponding oxide, and withdrawing effluent from said cell containing olefin oxide product.

19. A process for the manufacture of propylene oxide which comprises (a) providing an electrochemical cell containing an aqueous solution of an alkali metal chloride and having an anode and cathode disposed therein; (b)

subjecting said aqueous medium to the action of a direct electric current thereby generating chlorine in the aqueous medium in the vicinity of the anode and hydroxyl ions in the aqueous medium in the vicinity of the cathode; (c) maintaining said aqueous medium contained within the cell at a temperature from about 90° F. to about 200° F., (d) passing propylene into said cell such that it is contacted with aqueous medium in the vicinity of the anode to form propylene chlorohydrin; (e) maintaining a continuous flow of aqueous medium within the cell and such that the direction of flow is from the anode towards the cathode, said direction of flow being maintained by feeding aqueous medium to the anodic region of the cell and withdrawing aqueous medium from the cathodic region of the cell; (f) transporting propylene chlorohydrin within the cell towards the cathodic region by the said flow of aqueous medium and reacting chlorohydrin within said cell in the aqueous medium containing hydroxyl ions in the vicinity of the cathode to form propylene oxide to the substantial exclusion of propylene glycol; and (g) withdrawing vaporous effluent from the cathodic region of the cell containing propylene oxide as essentially the sole oxygen-containing derivative of propylene produced as a product of the process.

20. A process for the manufacture of olefin oxide which comprises (a) providing an electrochemical cell containing an aqueous solution of an alkali metal chloride and having at least one anode and at least one cathode disposed therein, said anode comprising a porous anodic surface and an inner chamber; (b) subjecting said aqueous medium to the action of a direct electric current thereby generating chlorine in the aqueous medium in the vicinity of the anode and hydroxyl ions in the aqueous medium in the vicinity of the cathode; (c) maintaining said aqueous medium contained within the cell at a temperature from about 90° F. to about 200° F.; (d) passing a normally gaseous olefin into said cell such that the olefin is fed only to the inner chamber of said anode and diffuses through the porous anodic surface and reacts in the aqueous medium in the vicinity of the anode to form the corresponding chlorohydrin derivative of the olefin; (e) maintaining a continuous flow of aqueous medium within the cell and such that the direction of flow is from the anode toward the cathode, said flow transporting chlorohydrin towards the cathodic region and being maintained by feeding aqueous medium only to the anodic region of the cell and withdrawing aqueous medium only from the cathodic region of the cell; (f) reacting the chlorohydrin within said cell in the aqueous medium containing hydroxyl ions in the vicinity of the cathode to form the corresponding olefin oxide, and (g) withdrawing effluent from the cathodic region of the cell containing said olefin oxide as a product of the process.

21. An electrochemical process for the production of olefin oxide which comprises electrolyzing an aqueous medium containing a water soluble metal halide in an electrolytic cell comprising a flowing amalgam cathode, generating halogen at the anode and forming elemental metal during said electrolysis, the metal enriching said flowing amalgam, passing an olefin to the vicinity of the anode of said electrolytic cell forming the halohydrin derivative of said olefin, passing aqueous medium containing the halohydrin, and said enriched amalgam, to an amalgam decomposer wherein the amalgam reacts with the aqueous medium contained therein to form the corresponding hydroxide of the amalgamated metal, the halohydrin reacting with the alkaline medium in said decomposer to produce the corresponding olefin oxide as a product of the process, and recovering said olefin oxide as a product of the process.

22. An electrochemical process for the production of olefin oxide which comprises electrolyzing an equeous medium containing a water soluble metal halide in an electrolytic cell comprising a flowing amalgam cathode to generate halogen and forming elemental metal, said metal enriching said flowing amalgam during electrolysis, passing an olefin to the vicinity of the anode of said electrolytic cell forming the halohydrin derivative of said olefin, passing aqueous medium containing said halohydrin from the electrolytic cell to an amalgam-oxygen fuel cell in combination therewith and passing at least a portion of said enriched amalgam from said electrolytic cell to said fuel cell, in said fuel cell bringing said amalgam into contact with the anode and introducing an oxygen-containing gas to the cathode to generate electrical energy and forming hydroxyl ion, the halohydrin contained in said aqueous medium reacting with the hydroxyl ion to form the corresponding olefin oxide as a product of the process, and passing the electrical energy generated by said fuel cell to said electrolytic cell as a partial source of electrical energy thereto.

References Cited by the Examiner

UNITED STATES PATENTS

| | | | |
|---|---|---|---|
| 1,253,617 | 1/1918 | McElroy | 204—80 |
| 1,446,872 | 2/1923 | Brooks | 260—348.6 |
| 1,589,358 | 6/1926 | Burdick | 260—348.6 |
| 1,695,250 | 11/1928 | Curme | 260—348.6 |
| 2,384,463 | 9/1945 | Gunn et al. | 136—86 |
| 3,103,473 | 9/1963 | Juda | 204—77 |

JOHN H. MACK, *Primary Examiner.*

WINSTON A. DOUGLAS, *Examiner.*

H. M. FLOURNOY, *Assistant Examiner.*